United States Patent [19]
Rinehart

[11] Patent Number: 5,356,710
[45] Date of Patent: * Oct. 18, 1994

[54] FIRE RETARDANT MULTI-LAYER STRUCTURES COMPRISING POLY(VINYL CHLORIDE) COMPOSITIONS EXHIBITING INCREASED ADHESIVITY TO POLYAMIDE COMPOSITIONS AND MULTI-LAYER STRUCTURES COMPRISING THE SAME

[75] Inventor: Robert E. Rinehart, Fredon, N.J.

[73] Assignee: AlliedSignal Inc., Morris Township, Morris County, N.J.

[*] Notice: The portion of the term of this patent subsequent to Jun. 28, 2011 has been disclaimed.

[21] Appl. No.: 663,970

[22] Filed: Mar. 4, 1991

[51] Int. Cl.$^5$ .................... B32B 27/08; D02G 3/00
[52] U.S. Cl. ..................... 428/378; 428/475.8; 428/476.1; 428/476.9; 428/518; 525/301
[58] Field of Search ............. 428/475.8, 518, 476.1, 428/476.9, 378; 525/301

[56] References Cited

U.S. PATENT DOCUMENTS

| | | | |
|---|---|---|---|
| 3,067,085 | 12/1962 | Limperos | 156/327 |
| 4,447,572 | 5/1984 | Scharf et al. | 524/371 |
| 4,477,523 | 10/1984 | Biggs | 428/389 |
| 4,743,637 | 5/1988 | Axelrod et al. | 524/94 |
| 4,868,054 | 9/1989 | Kartheiser | 428/383 |
| 5,102,931 | 4/1992 | Fuhr et al. | 524/126 |

FOREIGN PATENT DOCUMENTS

2191997  6/1973  France ................... 27/30
1257810  4/1968  United Kingdom .

OTHER PUBLICATIONS

Product Information Bulletin for :Saytex Flame Retardants.

*Primary Examiner*—Paul J. Thibodeau
*Assistant Examiner*—H. Thi Lê
*Attorney, Agent, or Firm*—Roger H. Criss

[57] ABSTRACT

Improved poly(vinyl chloride) compositions which exhibit improved adhesivity to improved polyamide compositions which find particular utility in the construction of multi-layer structures, particularly for the fabrication of structures for use in forming electrical insulation structures for wires and cables. In one useful embodiment, the multi-layer structure has in the following order: a layer of PVC and a layer of polyamide in contact with the layer of PVC wherein the layer of PVC includes a vinyl chloride containing copolymer or a terpolymer which exhibits good solubility with the PVC, and which further provides good adhesivity with the polyamide. The polyamide layer comprises an effective amount of an ethylene-bis-tetrabromophthalimide which acts as a fire retardant; the multi-layer structure exhibits good interfacial adhesion and excellent fire retardant characteristics.

9 Claims, 1 Drawing Sheet

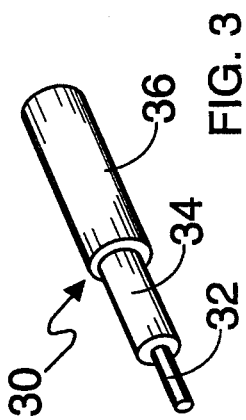
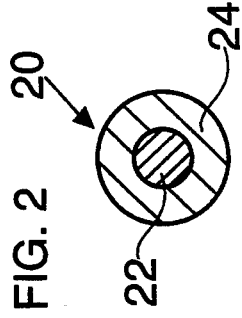
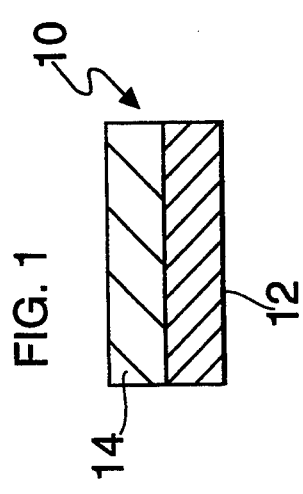
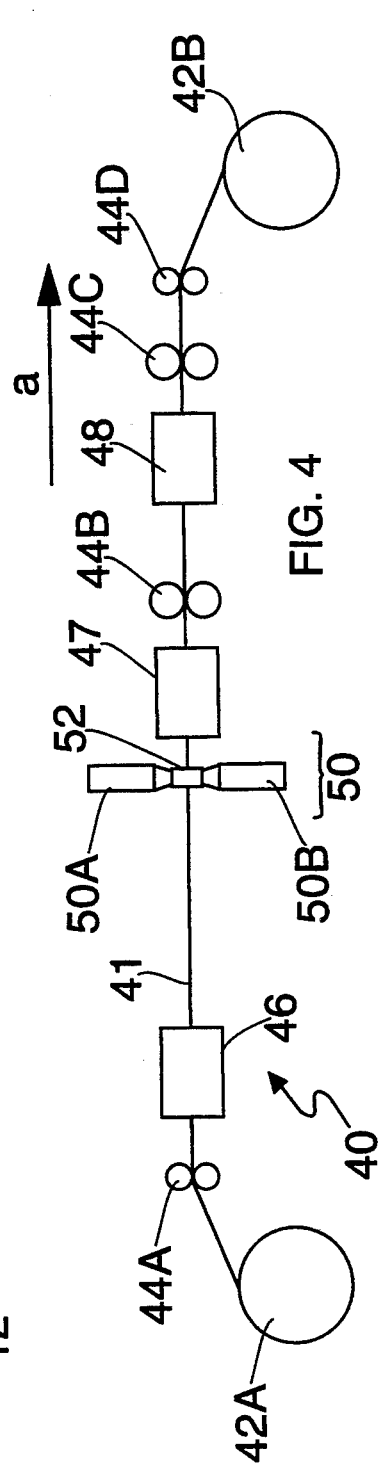
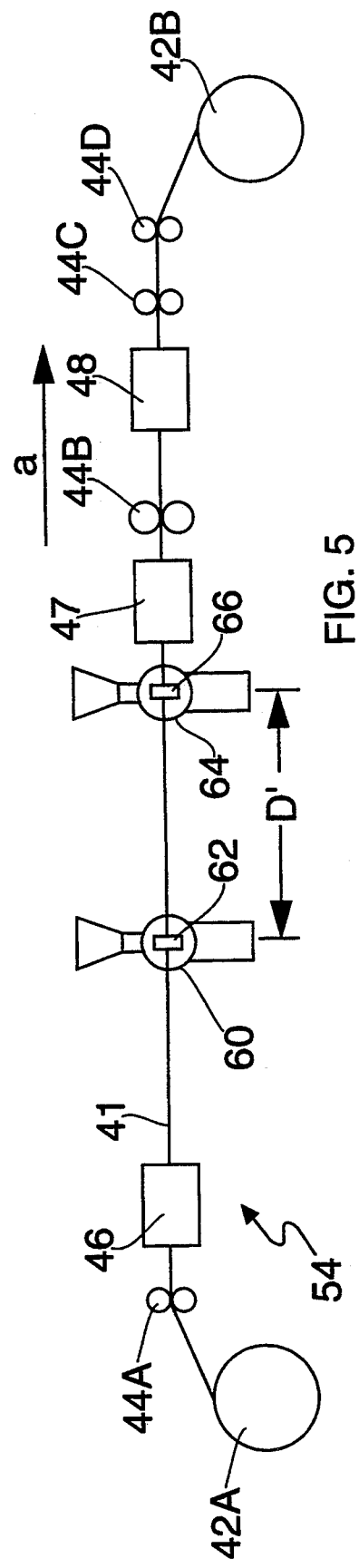

FIRE RETARDANT MULTI-LAYER STRUCTURES COMPRISING POLY(VINYL CHLORIDE) COMPOSITIONS EXHIBITING INCREASED ADHESIVITY TO POLYAMIDE COMPOSITIONS AND MULTI-LAYER STRUCTURES COMPRISING THE SAME

CROSS REFERENCE TO RELATED APPLICATIONS

The subject matter of the present application is commonly assigned to and comprises matter disclosed in copending U.S. patent application Ser. No. 07/580,232 filed Sep. 10, 1990 titled "Improvements in poly(vinyl chloride) compositions exhibiting increased adhesivity to polyamide and multi-layer structures comprising the same".

BACKGROUND OF THE INVENTION

1. Field of the Invention The present invention relates to improvements in poly(vinyl chloride) compositions which exhibit improved adhesivity to fire retardant polyamide compositions which find particular utility in the construction of multi-layer structures, particularly for the fabrication of improved structures for use in forming electrical insulation structures for wires and cables.

2. Description of the Prior Art

Multi-layer structures typically comprise at least two or more layers of materials featuring different physical properties, which properties are optimized in order to satisfy a particular need at hand. The goal of the formation of such structures is to provide a structure which is directed to a particular need, and wherein the individual layers of the structures act to form a composite, and where each layer of material contributes to serve the function for which the structure is designed. Examples of such structures are well known to the art, and include composites which are used to form films, wherein each layer forming the film may feature a particular property, such as impermeability to a gas, or as a blocking layer to light or radio energy of a particular wavelength. Another example of such a structure may be those which would be used to form an insulation structure for an electrical conductor, where each layer forming a jacket about the conductor might feature improved abrasion resistance, or improved dielectric strength, or the like. Other uses of such structures are notorious and well known to the art.

The use of such multi-layer structures forms the state of the art in electrical conductors. These conductors typically consist of a wire conductor (which is frequently a metal, including copper) which is surrounded by a multi-layer structure. Examples of such constructions include those taught in U.S. Pat. Nos. 3,576,940; 3,860,686; 4,079,191; 4,292,463; 4,327,248; 4,419,538; 4,472,597; 4,510,348; 4,626,619; and U.S. Pat. No. 4,691,082. Therein are disclosed a variety of constructions wherein each of the layers may be a polymer, a metal, an elastomeric material, a fibrous material, etc., where each layer offers a particular advantage, i.e., dielectric strength, water impermeability, etc.

Two favorable materials which may be used in the construction of electrical conductors are poly(vinyl chloride) (hereinafter interchangeably referred to as "PVC") and polyamides (hereinafter interchangeably referred to as "PA"). These materials are favored as the PVC generally forms a good flexible insulator, while simultaneously, PA generally exhibits good abrasion resistance properties. Examples of electrical conductors having a multi-layer structure of an inner layer of poly(vinyl chloride) and an outer layer of polyamide are taught in Japanese Patent 59146105, British Patent 1257810, and Dutch Patent 6917475, and U.S. Pat. No. 4,868,054.

While such multi-layer structures comprising a layer of PVC and PA when used as electrical conductors are seen to perform well, such a structure retains drawbacks. One problem is known to exist if the electrical conductor is stored outside and exposed to rain and high humidity. Upon contact with water, the polyamide layer tends to absorb moisture and expand considerably. This expansion causes the polyamide layer to swell away from the PVC layer and wrinkle. When the electrical conductor is then fed through a conduit, i.e. typically during installation, the wrinkled polyamide layer tears and the electrical conductor becomes unacceptable for use for its intended purpose. Further, a condition known to the art as "horse collaring" is known to occur, wherein sharp flexure of the wire causes separation of the polyamide and the poly(vinyl chloride) layers and the formation of bulges in the exterior layer in a direction transverse to that of the wire's length. The wire or cable exhibits an increased tendency to tear at such bulges, especially as the wire is subjected to mechanical stress as might be occasioned as the wire is pulled through a conduit, during installation of said wire or afterwards, due to vibration, thermal effects, etc.

It would be desirable to have a multi-layer structure where good adhesion exists between the PVC layer and the polyamide layer, and which exhibits good fire retardant properties. Fire retardancy is a highly desirable feature, particularly where a multi-layer structure is used to form electrical insulation layers enrobing an electrical current conductor, such as a wire or plurality of wires. As is known, electrical cables present in a commercial, residential or other structure (i.e., office buildings, homes, public buildings, and facilities) comprise a plurality of individual wires which are contained within a jacketing layer, or other plenum. In the event of a fire within such a structure, the hazard of such a fire would be greatly compounded where the insulation layer enrobing an electrical current conducting wire were to burn or melt off, and thereby expose the wire to contact with an alternate current path. Such a current path could be the structure or element of a structure within which the wire is present, or in the more undesirable alternative, with a person's body. Further, melting of an insulating layer of a current conducting wire, particularly where proximately located to other current conducting wires with similarly degraded insulation layers raises the risk of contact between the wires and the formation of a short circuit; such an event raises the risk of ignition of surrounding materials. Alternately, if surrounding materials are not ignited, there remains the risk and consequent hazard of the ignition, burning or melting of the materials used to form insulating layers over the wire. Such materials frequently emit harmful emissions, which in sufficient concentration may prove fatal. Accordingly, there exists a continuing need in the art in providing multi-layer structures which feature fire retardancy, and good physical characteristics.

Multi-layer structures having a PVC layer, an adhesive layer, and a polyamide layer are known. Japanese Patent 62041039 teaches an adhesive layer comprising an acid-modified olefinic polymer and an acid-modified halogen-containing olefinic polymer. German Patent 1669973 teaches an adhesive layer having: (1) a primer layer comprising a mixture of epoxide compounds, hardener, and solvent, and (2) an epoxy adhesive layer. Further, U.S. Pat. No. 4,868,054 to Kartheiser describes a multilayer structure comprising a first layer comprising poly(vinyl chloride) and a second layer comprising a polyamide; the structures feature good interfacial adhesion between the layers.

While these multi-layer structures known to art may be beneficially used, there remains a continuing need in the art for multi-layer structures which would be particularly useful as insulation structures for electrical conductors wherein improved adhesion between the layers exists, and which feature a high degree of fire retardancy.

SUMMARY

The present invention provides a multi-layer structure having improved adhesion between its layers. The multi-layer structure has in the following order: a layer comprising a plasticized PVC; a layer comprising a polyamide having improved fire retardant characteristics. The PVC comprising layer includes up to about 10 percent by weight of a vinyl resin, where said resin is a copolymer or a terpolymer which exhibits good solubility with the PVC, and which further provides good adhesivity with the PA comprising layer.

The present invention also provides an electrical conductor comprising in the following order of structures which are layered in register: a wire conductor, a layer of PVC which comprises a vinyl chloride-vinyl acetatevinyl alcohol terpolymer resin which provides improved adhesivity, and a layer comprising polyamide.

It has been found that the foregoing terpolymer resin when included in the PVC provides superior adhesion between the PVC and PA layers. When subjected to testing to determine the interlayer adhesion between the PVC and the PA layers, structures which included the resin in the PVC were found to have markedly improved resistance to separation as compared to PVC and PA structures without any intermediate adhesive, or without any adhesive.

The present invention also provides an improved extrusion method of producing an improved structure comprising a wire conductor, a layer of PVC which includes a vinyl resin providing improved adhesivity, and a layer of polyamide.

Other advantages and features of the present invention will become apparent from the following description, attached drawings, and claims.

BRIEF DESCRIPTION OF THE DRAWINGS

FIG. 1 is an end perspective view of one aspect of the invention, showing a multi-layer structure wherein the PVC and PA layers are of a generally planar form.

FIG. 2 is an end perspective view of a further aspect of the instant invention and shows a perspective view of a multi-layer structure in accordance with the present invention.

FIG. 3 is a further embodiment of the present invention, and illustrates an exploded perspective view of an electrical conductor utilizing the multi-layer structure of the present invention.

FIG. 4 is a schematic representation of an industrial process for producing a multi-layer structure of the invention by coextrusion techniques.

FIG. 5 is a further schematic representation of an industrial process for producing a multi-layer structure of the invention by tandem extrusion techniques.

DESCRIPTION OF THE PREFERRED EMBODIMENTS

According to the invention, a multi-layer structure having improved adhesion between its layers is provided, wherein a first layer comprises poly(vinyl chloride) and a vinyl chloride comprising copolymer or terpolymer, and a second layer comprising a polyamide. The structure exhibits improved adhesion between the first and second layers without the use of any intermediate material disposed between the layers having adhesive properties.

As has been noted above, the first layer comprises PVC and a copolymer or terpolymer. The PVC to be incorporated may be any grade of PVC desired, and as such allows for considerable flexibility in the specification of the PVC. The PVC may exhibit any desired physical properties, such as a desired molecular weight, flame retardant properties, or temperature duty rating, and may further include quantities of additives commonly used in the art, in amounts which are not found to be detrimental to the efficacy of the adhesion between the PVC and the PA layer One such additive are pigments or other coloring agents which may be blended or otherwise incorporated into the PVC layer; such colorants are useful in wire "coding" or other identification and/or marking systems and are well known to the art.

A further useful additive which may be incorporated in the PVC is a plasticizer. The plasticizer acts to reduce the viscosity of the PVC during the production process, and thereby improve its processability. The amount of plasticizer which may be used is any amount which provides desirable processability for the formation of the structure of the present invention. By way of non-limiting example, in the production of insulated electrical wires, loading of between approximately 10% to 50% by weight of plasticizer into the PVC are used, although higher and lower amounts may be used. Examples of useful plasticizers include phthalate plasticizers, and preferably are one or more from the group consisting of di-2-ethylhexyl phthalate (DOP), diisodecyl phthalate (DIDP), diundecyl phthalate (DUP), and ditridecyl phthalate (DTDP). Equally preferred are trimellitate plasticizers, especially trioctyltrimellitate (TOTM) and triisooctyltrimellitate (TIOTM). These preferred trimellitate and phthalate plasticizers are commercially available.

Other additives may be also included in the composition. Constituents such as lead stabilizers, tin stabilizers, inorganic fillers such as clays, calcium carbonates, talc, waxes, wollastonite, or silica as well as various types of lubricants which are known and in common use in the art may also be introduced as additives into the composition according to the invention. Further additives include those which are broadly referred to as "synergists" useful for their fire retardant properties. One non-limiting example of such a synergist are antimony oxides, but other compositions including zinc borate and iron oxide, as well as other compositions which behave as synergists may also be incorporated into compositions in according with the inventors' teachings.

The vinyl chloride comprising copolymer or terpolymer of the present invention may be any hydroxyl-modified vinyl chloride/vinyl acetate/vinyl alcohol terpolymers, having a hydroxyl content in excess of 2 percent. Examples of such terpolymers which have been found to be useful include those materials sold under the trademark UCAR ® resins by Union Carbide Corp of Danbury, Conn. and designated as "VAGH" and "VAGD" and are described as hydroxyl modified resins consisting of vinyl chloride containing terpolymers and having a hydroxyl content of approximately 2.3 percent. Of these materials, those copolymers selected from the group consisting of partially hydrolyzed vinyl chloride/vinyl acetate/vinyl alcohol terpolymers designated "VAGD", and "VAGH" have been found to be particularly useful. The VAGD and VAGH terpolymers are both described as comprising of 90% by weight vinyl chloride units, 4% by weight vinyl acetate units and 6% by weight vinyl alcohol units, and having a hydroxyl functionality of about 2.3% by weight, and a hydroxyl value of 76. These materials are further described as having a specific gravity of 1.39 according to ASTM D792. More particularly, the VAGH resin is described as having a glass transition temperature of 79 deg. C., and a number average molecular weight of 27,000. Similarly, the VAGD resin is described as having a specific gravity of 1.39 according to ASTM D792, a glass transition temperature of 77 deg. C., and a number average molecular weight of 22,000. These terpolymers may be included in the PVC composition in any amount which results in effective bonding between the PVC comprising layer, and PA layer; amounts of as little as 1% by weight relative to the weight of PVC have been found to provide adhesivity between the PVC and PA layers. Preferably, the quantity of the terpolymer should exceed this amount, and quantities in excess of about 2% are to be preferred, with the most preferred amount to be between about 2% and about 10%. While still larger amounts of the terpolymer may be substituted, the economy of such a substitution would be offset by the marginal increase in adhesivity achieved.

It has been found that such vinyl chloride-vinyl acetate-vinyl alcohol terpolymers may be utilized to provide enhanced adhesion between layers of PVC and PA, especially nylons. It has also been found that these terpolymers exhibit good solubility in plasticized PVC, and the presence of hydroxyl groups on the terpolymer enhances the adhesion of the co- and/or terpolymer containing PVC to the PA layer. It has been noted that the presence of up to about 5% hydroxyl concentration, and preferably between about 2% and 3% hydroxyl concentration enhances the adhesivity between the PVC and PA layers.

In accordance with the teachings of the present invention, it is recognized that any amount of the terpolymer may be incorporated into the PVC with the sole proviso that an improvement in the adhesion between the PVC containing layer and a PA containing layer is ultimately realized. Preferably, the weight percentage of the terpolymer in the PVC composition is within the range of between 0.001% and 20%, more preferably falls within the range of between 0.01% and 12%, and most preferably is found between the range of 0.01% and 5%.

The PVC and the terpolymer constituents may be combined in any manner capable of thoroughly distributing the materials within one another. Methods which are recognized as suitable for use include physical mixing such as the physical mixing attained via the use of a tumbling vessel, and by melt extrusion. Preferably, the constituents are melt extruded wherein measured amounts of the PVC and terpolymer constituents are physically mixed and subsequently introduced to a single screw extruder, twin-screw extruder, or plasticator, heated to a temperature above the softening point of at least one of the constituents and subsequently extruding the constituents through a die to form strands which are then pelletized. The resulting pellets comprising the PVC and the terpolymer are then used as the feedstock for the further extrusion operations in accordance with the present invention.

Polyamides suitable for use in conjunction with the instant invention include well-known polyamides which are long chained polymeric structures having recurring amide groups as part of their polymer backbone. Preferably, the polyamides have a relative viscosity of from about 40 to about 250 measured in 90% formic acid at a concentration of 9.2 weight percent.

Non-limiting examples of such polyamides are:
(a) those prepared by the polymerization of lactams, such as epsilon-caprolactam (nylon 6);
(b) those prepared by the condensation of a diamine with a dibasic acid, and preferably the condensation of hexamethylene diamine with adipic acid (nylon 6,6); the condensation of hexamethylene diamine with sebacic acid (nylon 6,10), the condensation of tetramethylenediamine with adipic acid (nylon 4,6), and the condensation of hexamethylene diamine with azelaic acid (nylon 6,9);
(c) those prepared by self-condensation of amino acids, and preferably self-condensation of 11-aminoundecanoic acid (nylon 11) and self-condensation of 12-aminododecanoic acid (nylon 12); and
(d) those based on polymerized vegetable oil acids, or random, block, or graft interpolymers consisting of two or more of these polyamides, or polyamide blends.

Preferred polyamides are polyepsiloncaprolactam (nylon 6), polyhexamethylene adipamide (nylon 6,6), and a copolymer of polyepsiloncaprolactam and polyhexamethylene adipamide (nylon 6,6/6). The most preferred polyamide is polyepsiloncaprolactam (nylon 6).

Amorphous polyamides such as those prepared with a diacid and meta-or para-xylene diamine, 4,4'-methylenedianiline, 1,3- or 1,4-phenylenediamine, or 2,4- or 2,6- diaminotoluene are also useful.

The aforementioned polyamides containing various terminal functionalities are also suitable for use in the present invention. These include the preferred polyamides which comprise polycaprolactams (nylon 6) which include (a) a carboxylic group attached to one end and an acetamide group attached to the other end of the polymer chain, (b) an amino group attached to both ends of the polymer chain, (c) a carboxyl group attached to one end and an amino group attached to the other end of the polymer chain, and (d) a carboxyl group attached to both ends of the polymer chain. Of these, most preferred are those categorized as (c) above, and include a polycaprolactam having a carboxyl group attached to one end and an amino group attached to the other end of the polymer chain.

The polyamide layer may also include various amounts of additives which are of common usage in the art. Examples of such additives include pigments, dyes, heat stabilizers, lubricants such as sodium stearate, zinc stearate, plasticizers including caprolactam, UV absorbers and stabilizers.

In accordance with the present invention's teaching, the polyamide layer comprises a fire-retarding additive. Useful fire-retarding additives include ethylene-bistetrabromophthalimides which have the structure:

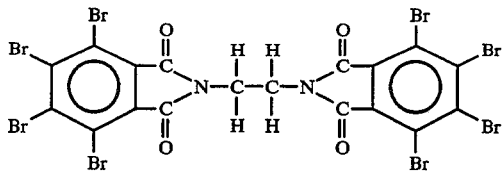

This material may be added in any amount which is found to be effective in enhancing the fire retardant behavior of the composition of the layer of which it forms a part; preferably the ethylene-bis-tetrabromophthalimides are present so to comprise less than 50% of the total composition, more preferably less than 30% and most preferably less than 20% of the polyamide comprising composition of which it forms a part. Such additives are commercially available in the form of a powder, and are further characterized as exhibiting a melt temperature range of 445–458 deg. C.

A further useful additive which may be incorporated into the polyamide comprising layer includes those which include the characteristic of exhibiting fire retarding properties, also referred to as "synergists". Several of such materials include antimony oxides, zinc borate and iron oxide, all of which are known to the art in increasing the fire retardant behavior of polyamide comprising compositions. These materials may be included in any amount determined to be effective in improving the fire retardant behavior of compositions of which it forms a part. Of these, the most preferred is antimony trioxide, which is included in any effective amount, preferably to comprise less than 20% of the polyamide comprising layer, and most preferably less than 10% of the polyamide comprising layer. Antimony trioxide is presently commercially available in the form of powders or in pelletized form.

Such fire-retarding additives may be present in any amount which is found to be effective in increasing the fire retardant behavior of the polyamide layer of which it forms a part. As will be understood by those skilled in the art, this amount is subject to experimental determination, and as such may comprise in excess of 50% by weight of the polyamide containing composition. Nonetheless it has been found that effective fire-retardant characteristics have been imparted to the polyamide compositions wherein the fire-retarding additive is present in an amount to constitute between 5 and 30 parts by weight relative to the total weight of the polyamide composition; preferably these additives are present in amounts to constitute between 5 and 20 parts by weight.

The polyamide and the fire-retarding additive may be combined in any manner capable of thoroughly distributing the materials within one another. Suitable methods include physical mixing such as the physical mixing attained via the use of a tumbling vessel, and by melt extrusion. Preferably, the constituents are melt extruded wherein measured amounts of the PVC and terpolymer constituents are physically mixed and subsequently introduced to a single screw extruder, twin-screw extruder, or plastificator, heated to a temperature above the softening point of at least one of the constituents and subsequently extruding the constituents through a die to form strands which are then pelletized. The resulting pellets comprising the PVC and the terpolymer are then used as the feedstock for the further extrusion operations in accordance with the present invention.

The compositions of the PVC comprising layer and the PA comprising layer were evaluated in order to determine the physical characteristics thereof. Evaluation of the physical properties of the compositions forming either of the samples were performed on injection molded test bars having dimensions of 5 inches by 0.5 inch by 0.25 inch formed from samples of each of the compositions under the following protocols: Notched Izod Impact, ASTM D-256 test, Flexural Properties, ASTM D-790 test. Tensile Strength and Properties were performed on tensile "type 2" bars having dimensions of 5 inches by 0.25 inches by 0.125 inch in accordance with the protocols set forth in ASTM D-638. The protocols for these properties are well known to those skilled in the art.

The flame retardancy of compositions herein were evaluated in accordance with the established protocol of the Underwriter's Laboratories UL-94 Tests for the Flammability of Plastic Materials, particularly the "Vertical Burning Test for Classifying Materials 94-V-0, 94-V-1, 94-V-2" which is fully described in the publication "Standard for Safety-Tests for Flammability of Plastic materials for Parts in Devices and Appliances" copyrighted 1973, 1988 and as revised Mar. 19, 1990 at pages 7–10, the complete contents of which are herein incorporated by reference. In brief summary the UL-94 Vertical Burning Test is used to evaluate the performance of bar specimens when contacted with a flame. Sample bars of each specimen are first conditioned in an air circulating oven, and then each of five bars of each of the sample specimens to be evaluated are supported at one end so to extend vertically from the support. A layer of dry absorbent cotton is placed 12 inches below the bar, and then the flame is applied for a ten (10) second interval at the center of the bar. The flame is withdrawn and for the subsequent thirty (30) seconds the bar is visually observed to note the duration of flaming and/or glowing. If it is difficult to distinguish between flaming or glowing, the cotton is brought up into contact with the bar and if ignition occurs, the condition of the bar is considered as flaming. The test is repeated again on the same sample bar for each sample bar to again determine the flammability characteristics thereof. Conditions to be observed and recorded include: (a) duration of flaming after the first flame application, (b) duration of flaming after the second flame application, (c) duration of flaming plus glowing after the second flame application, (d) whether or not specimens are consumed and burn to the holding clamp, and (e) whether or not the specimen drips flaming particles which ignite the cotton swatch.

A further test to determine the flammability of structures was also performed. The Limiting Oxygen Index, (LOI) was determined to establish the minimum concentration of oxygen needed to maintain a candle-like combustion of a sample structure. In this test, a test specimen is placed vertically in a glass cylinder, ignited, and a gas stream of a mixture of oxygen and nitrogen are upwardly directed through the glass cylinder so to pass past vertically oriented wire sample. An initial oxygen concentration is selected, the specimen ignited from the top, and the length of burning and the time are noted. Subsequently, the concentration of oxygen in the stream is increased or alternately decreased, and the same specimen is reignited or alternately, a new specimen is provided in like manner to the glass cylinder and ignited. This test is repeated until the lowest concentration of oxygen needed to support a steady, candle-like combustion of a specimen is maintained. The value determined is a numerical value which equals the percentage of oxygen gas in the oxygen/nitrogen gas stream used during the test; higher percentages of oxygen indicate resistance to flammability of a sample, and conversely, lower percentages of oxygen indicate more ready flammability of a test sample.

Both layers, i.e. the PVC and the PA layer may be in the form of a film or sheet obtained by separate extrusion processes, or alternately may be co-extruded. Similarly, if the PVC and the PA layer are of a different form, such form may be either separately, sequentially or co-extruded. Although dependent upon the particular intended application, typically the PVC comprising layer has a thickness of about 0.25 to about 2.30 mm, (about 0.010 to about 0.090 inches), and typically, the polyamide layer may have a thickness of about 0.05 to about 0.40 mm (about 0.002 to about 0.016 inches). It is to be understood that these thicknesses are for the purpose of illustration, and are not to be considered limiting the applicability of the teachings of the present invention.

The multi-layer structure according to the instant invention can be used in any application. In general, the multi-layer structure is useful as an insulation and protective jacket. More specifically, the multi-layer structure in tubular form finds particular use in protecting a wire conductor, and in some applications in residential and/or commercial structures, and in protecting optical fibers. Such a structure is shown in FIG. 1 which is an end perspective view showing a multi-layer structure wherein the PVC and PA layers are of a generally planar form. As is shown, the structure 10 comprises two layers, a first layer 12 of PVC and a second layer 14 of PA. As is illustrated, the layers 12,14 are layered in register with one another. It is further seen that there is no intermediate structure disposed between the layers 12,14 which might be indicative of an adhesive material or the like.

FIG. 2 is an end perspective view of a further structure 20 according to the instant invention and shows a perspective view of a multi-layer structure in accordance with the present invention. The structure 20 comprises a first core-type layer 22 which, in contrast to the structure 10 according to FIG. 1 is seen to be generally non-planar but cylindrical in form. The structure 20 further includes a second layer 24 which comprises a PA layer, and is layered in register with the first layer 22. Similarly, these layers 22,24 are seen to be layered in register with one another, and FIG. 2 further shows the absence of any intermediate structure which might be indicative of an adhesive material or the like.

FIG. 3 portrays a further embodiment of the present invention, and illustrates an exploded perspective view of an electrical conductor 30 utilizing the multi-layer structure of the present invention. The electrical conductor 30 comprises a wire conductor 32 which may be formed from any suitable metal including copper, aluminum, copper-coated tin, silver-plated copper, and stainless steel. The wire conductor 32 may be of any suitable size, including but not limited to those between 1,000,000 CM ("circular mil") to about 22 AWG ("American Wire Gauge"), although it is contemplated that other wire conductors not within this particular preferred range may also enjoy the benefits of the present invention. Further, the wire conductor 32 may be a single solid metal conductor or a plurality of metallic conductors.

The first layer 34 (or "inner layer") contacting the electrical conductor 20 is a layer of PVC which includes the co- or terpolymer and other additives in accordance with the teaching of the instant invention. This first layer 34 is in intimate contact with the wire conductor 32 and may be formed about the electrical conductor 20 by any suitable means. An extrusion process would be preferred. The thickness of the first layer 34 may be any desirable thickness and is not consequential to the practice of the present invention. However, thicknesses which are in common use are preferably employed. The second layer 36 (or "outer layer") intimately contacting the first layer 34 is a polyamide layer comprising the fire-retarding constituent, and it may be formed about the first layer 32 by any suitable means, with an extrusion process being preferred. Similarly, the thickness of the second layer 36 is not consequent to the enjoyment of the invention, although thickness which are in common use may be employed.

Turning now to FIG. 4, therein is illustrated a schematic representation of an industrial process for producing a multi-layer structure of the invention by coextrusion techniques.

A wire coating line 40 includes an extruder 50 having two barrels 50A and 50B equipped with a coextruding die 52 capable of extruding the PVC containing the terpolymer and other constituents and PA comprising composition to form a structure onto the wire 41 in accordance with the present invention. Optionally, the wire coating line 40 includes a wire payout reel 42A for supplying wire 41, a wire takeup reel 42B for collecting wire 41 after it has been coated, a series of capstans/pinch rollers 44A, 44B, 44C, 44D which act to guide and/or transport the wire 41, and further equipment, including a wire pretreater 46 located before the extruder 50, a wire posttreater 47, and a marking station 48.

The production process necessary to enjoy the benefits of the present invention are processes which are generally utilized to form multi-layered insulated wires and cables. As such, the features of the processes discussed in conjunction with FIGS. 4 and 5 are to be considered illustrative, and not limiting. Generally, bare wire 41 is played from the wire payout reel 42A where it passes through rollers 44A and to a wire pretreater 46. The wire pretreater 46 is an optional process device within which the bare wire 41 may be conditioned prior to its coating in the extruder 50. Such conditioning may include preheating, chemical/physical cleaning operations, and/or other operations. Subsequently, the wire 41 enters into the crosshead supplied by the two extruders 50 which includes a die 52 capable of extruding the two layers, i.e. the PVC layer and the PA layer onto the wire in accordance with the discussion of the constructions and compositions disclosed above. It is contemplated that the two extruders 50 and the coextrusion die 52 may be any of those presently known to the art, or those yet to be developed which find utility in extruding a plurality of layers of material onto a wire or other structure. One example which is presently known to the art comprises two extruders each having at least one hopper for the containment and feeding of the PVC comprising composition and the PA comprising composition which feed their respective constituents to the heated barrel of each of the extruders, which softens the respective compositions and which leads to a suitably formed die 52 which sequentially extrudes the material onto the wire or other structure. Such extruders typically include a rotating screw within each heated barrel (shown on FIG. 4 as 50A and 50B) to effectively mix each of its constituents and to force it into the die 52. The one-stage extrusion process provides benefits which include rapid throughput and overall production rates.

Subsequent to the coextrusion, the exiting wire 41 may optionally be subjected to a wire posttreater 47 which is a conditioner or conditioning step subsequent to the application of the insulation structure onto the wire 41. The posttreater 47 may be any conditioning step or operation, and might comprise a cooling operation, a further heating process to drive off any organic materials and/or effect curing of one or both of the layers extruded onto the wire 41, a quenching operation such as a water bath, or other beneficial conditioning process. Subsequently, the wire 41 passes through further capstans/pinch rollers 44B and may be passed to an imprinting station 48 wherein the exterior of the insulated wire 41 is marked with identifying information in a manner well known to the art. Subsequently, the wire 41 passes through further capstans/rollers 44C, 44D and is taken up by the wire takeup reel 42B. Thence, the insulated wire 41 may be removed from the wire coating line 40 and utilized.

FIG. 5 is a further schematic representation of a process for producing a multi-layer structure of the invention by a "tandem" extrusion process. This wire extrusion line 54 substantively differs from that portrayed in FIG. 4 only by the substitution of the single crosshead die 52 as shown on FIG. 4 with two extruders 60, 64 each with its own die, 62, 66; consequently, similarly designated elements within FIG. 4 and FIG. 5 are considered interchangeable and commentary concerning their operation as discussed for FIG. 4 is deemed equivalent and incorporated herein by reference. In this embodiment of the invention as shown on FIG. 5, the wire 41 entering a suitable die 62 which is fed by the extruder 60 and is coated with a first layer of the PVC composition as discussed above. The wire 41 coated with the PVC comprising composition then travels over a distance "D'" before where it is coated within a second die 66 which is fed by extruder 64 with the polyamide layer to form a structure in accordance with the teachings of the present invention. The distance "D'" may be any distance less than a distance where it is observed that the bonding between the PVC and the PA layers is unsatisfactory.

In the foregoing discussion of FIG. 4 and FIG. 5, the use of multi-layer structures of the present invention have been discussed and described in conjunction with the formation of an insulation structure for a wire conductor or wire cable. However, the utility of the invention in other applications which might find benefit is not to be discounted; usage with other strand type materials, including fibers, optical fibers and the like are expressly contemplated. Further, the relative terms "inner" and "outer" have been used in describing the relative position of the PVC comprising and the PA comprising layers; such a convention has been adopted as a matter of convenience and not as a matter of necessity. Constructions where the PA layer forms the "inner" layer and the PVC comprising layer forms the "outer" layer are contemplated.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

Examples 1-2

Comparative example compositions were formed from a batch of material comprising 100% of Capron ® 8224 HS, a heat stabilized nylon 6 homopolymer containing resin described as having a specific gravity according to ASTM D-792 of 1.13, and melting point of about 420 deg. F., and functionally characterized as a medium viscosity, heat stabilized extrusion grade resin suitable for extrusion for THHN, THWN, shipboard cable, building wire, and nonmetallic sheathed cable primary having the following physical characteristics: ultimate elongation, about 200 %, flex strength about 16,200 psi, a flexural modulus of about 400,000 psi, notched Izod impact strength of about 1.0 ft-lbs./inch in the form of pellets, was provided to the feed of a single screw extruder Operating under the approximate conditions as follows: temperature profile; zone 1, set temperature, 266 deg. C, zone 2, set temperature, 261 deg. C, zone 3, set temperature, 255 deg. C, zone 4, set temperature 250 deg. C, zone 5, set temperature 240 deg. C, zone 6, set temperature 240 deg. C, zone 7, set temperature 240 deg. C The screw was operated to rotate at 100 RPM, and the pressure at the breaker plate registered 700 psi. The extrudate was formed into strands which were subsequently pelletized. The pellets were used for the subsequent formation of standard test bars in an Arburg injection molding machine. These compositions are illustrated on Table 1.

TABLE 1

| Constituent: | Compositions | | | |
|---|---|---|---|---|
|  | Ex. 1 | Ex. 2 | Ex. 3 | Ex. 4 |
| nylon 6 resin: | 100 | 100 | 85 | 85 |
| ethylene-bis-tetrabromophthalimide: | — | — | 10 | 10 |
| antimony trioxide: | — | — | 5 | 5 |

The test samples were evaluated for physical properties, as well as flammability testing to determine the Limiting Oxygen Index as generally discussed above. These results of the physical and flammability testing are noted on Table 2.

TABLE 2

| | Physical Properties | | | |
|---|---|---|---|---|
| | Ex. 1 | Ex. 2 | Ex. 3 | Ex. 4 |
| Flexural Stress, (1000's psi): | 16.2 | — | 16.1 | 16.5 |
| Flexural Modulus, (1000's psi): | 400 | — | 456 | 455 |
| Yield Tensile Strength, (1000's psi): | 12 | — | 11.2 | 11.1 |
| Ultimate Tensile Strength, (1000's psi): | 7.6 | — | 11.2 | 8.4 |
| Notched Izod, (ft-lb/inch): | 1.02 | — | 0.81 | 0.81 |

TABLE 2-continued

| Physical Properties | | | | |
|---|---|---|---|---|
| | Ex. 1 | Ex. 2 | Ex. 3 | Ex. 4 |
| Limiting Oxygen Index (LOI): | — | 22.8 | — | 25.4 |

Example 3–4

A masterbatch comprising 85% of Capron® 8224 HS, a heat stabilized nylon 6 homopolymer containing resin as described in conjunction with Examples 1–2, 10% of an ethylene-bis-tetrabromophthalimide commercially available from the Ethyl Corporation under the trade designation Saytex® BT-93 ™ in the form of a light, yellowish powder and 5% of antimony trioxide in the form of a white, free-flowing powder. The antimony trioxide was commercially available from Laurel Industries, of Ohio. was provided to the feed inlet of thee single screw extruder operating under the same conditions as described for producing the compositions of Examples 1–2 and formed into an extrudate which was subsequently formed into strands and pelletized. The pellets were next used as feedstock for the formation of standard test bars in an Arburg injection molding machine. These compositions are previously denoted on Table 1.

The test samples of Examples 3–4 were evaluated for physical properties, as well as flammability testing to determine the Limiting Oxygen Index as generally discussed above. These results of the physical and flammability testing are noted on Table 2.

As a review of these results show, a comparison of the LOI (Limiting Oxygen Index) determined for the sample of Example 8 is seen to realize an improvement over the determined values of the control, Example 2, while providing good physical characteristics.

Example 5

A PVC comprising composition comprising 90 parts by weight of Noraplas 19940, described as a plasticized PVC was combined with 10 parts by weight UCAR® VAGH terpolymer resin by melt extrusion in a Killion one-and-one-quarter inch single screw, non intensive extruder. The extrudate was pelletized.

The composition of Example 3 in the form of pellets were used to ultimately form the polyamide comprising composition used to form a structure according to the present invention. The apparatus used to form said structure was similar to that illustrated on FIG. 5.

Subsequently the pelletized plasticized PVC comprising composition was provided to a first extruder with a barrel of a length/diameter ratio of 24/1, and further having a Barrier Maddox screw which was operated under the following conditions: temperature profile: zone 1, set temperature, 290 deg. F., zone 2, set temperature, 340 deg. F., zone 3, set temperature, 340 deg. F., zone 4, set temperature 340 deg. F., crosshead die head, set temperature 340 deg. F. The screw was operated to rotate at 65 RPM, the motor drew 8 amperes of current, and the pressure was registered at approximately 1600 psi. The extrudate was extruded onto a 14 gauge twisted copper conductor at a throughput rate of 67 feet per minute (fpm). Into a second single barrel extruder having an L/D ratio of 24/1 and equipped with a Barrier Maddox screw, the pelletized composition of Example 3 was provided. The second extruder was maintained at the following operating conditions: temperature profile: zone 1, set temperature, 370 deg. F.; zone 2, set temperature, 440 deg. F.; zone 3, set temperature 460 deg. F.; backplate temperature 410 deg. F. The screw was operated to rotate at 20 RPM, the motor drew 2.5 amperes of current, and the pressure was registered at 600 psi. The extrudate from the second extruder was extruded onto the layer of the PVC comprising composition onto the wire conductor which, as previously described was moving at the rate of 67 fpm.

The thickness of the layer of the PVC comprising composition varied between 0.10 inch and 0.28 inch along the length of the wire, similarly the thickness of the PA comprising composition was also permitted to vary between 0.003 inch and 0.0045 inch along the length of the wire.

Three sample specimens (Samples 1–3) were cut from sections along the length the coated wire the positions of which were randomly selected. Each specimen was evaluated for the interfacial adhesive strength between the two layers; in each of the sample specimens, the wire samples showed good interfacial adhesion between the PVC containing layer and the PA comprising layers as was evidenced by difficulty in manually separating the layers from one another.

The three sample specimens were also subjected to the Underwriter's Laboratories UL-94 Tests for the Flammability of Plastic Materials as described above. Each of the samples was contacted with the flame of the burner five successive times. The results of this test is illustrated on Table 3.

TABLE 3

| | VW-1 Test | | |
|---|---|---|---|
| Flame Application | Sample 1 | Sample 2 | Sample 3 |
| 1st | 1 sec. | 0 | 0 |
| 2nd | 0 | 0 | 0 |
| 3rd | 0 | 0 | 0 |
| 4th | 0 | 0 | 0 |
| 5th | 0 | 0 | 0 |

As results of the UL-94 test on the sample specimens illustrates, the multi-layer structure of the instant invention as used as an insulating structure on an electrical conductor provided excellent fire retardant characteristics with only brief ignition of only one sample, Sample 1. Further, the layer of the multi-layer structure also featured good interfacial adhesion and the layers could only be pulled apart with moderate difficulty.

As should be evident from the present specification, the invention provides improved compositions which when formed into a multi-layer structure provides good physical and mechanical characteristics, good interfacial adhesion between the poly(vinyl chloride) comprising layer, and the poly(amide) comprising layer which structure provides excellent fire retardant behavior.

It will be appreciated that the instant specifications and examples set forth herein are by way of illustration and not limitation, and that various modifications and changes may be made without departing from the spirit and scope of the present invention, whose limitations are bounded only by the appendant claims.

I claim:

1. A multi-layer structure consisting essentially of:
a substrate comprising an electrical conductor or an optical fiber;
a first layer surrounding said substrate, said first layer comprising a poly(vinyl chloride), a plasticizer and more than zero percent and up to 10 percent by weight of a vinyl chloride-vinyl acetate-vinyl alcohol terpolymer; and a second layer surrounding said first layer and comprising a polyamide and an ethylene-bis-tetrabromophthalimide.

2. The structure according to claim 1 wherein said polyamide is one selected from the group consisting of
   (a) those prepared by the polymerization of lactams;
   (b) those prepared by the condensation of a diamine with a dibasic acid;
   (c) those prepared by self-condensation of amino acids; and
   (d) those based on polymerized vegetable oil acids, or random, block, or graft interpolymers or blends of two or more of said polyamides.

3. The structure according to claim 1, wherein said polyamide is selected from the group consisting of polyepsilon caprolactam, polyhexamethylene adipamide and copolymers of polyepsilon caprolactam and polyhexamethylene adipamide.

4. The structure according to claim 1, wherein said polyamide contains terminal functional groups selected from the group consisting of hydroxyl, carboxyl, carboxylic, amide, acetamide, and amine.

5. The structure according to claim 1, wherein said plasticizer is selected from the group consisting of phthalate plasticizers and trimellitate plasticizers.

6. The structure according to claim 5, wherein said plasticizer is selected from the group consisting of di-2-ethylhexyl phthalate, diisodecyl phthalate, diundecyl phthalate, ditridecyl phthalate, trioctyltrimellitate and triisooctyltrimellitate.

7. The structure according to claim 1, wherein said second layer further comprises a fire retardant synergist selected from the group consisting of antimony oxide, zinc borate and iron oxide.

8. The structure according to claim 1, wherein said first layer further comprises at least one additive selected from the group consisting of lead stabilizers, tin stabilizers and inorganic fillers.

9. The structure according to claim 1, wherein said substrate is an electrical conductor.

* * * * *